United States Patent [19]
Babinger

[11] Patent Number: 5,803,356
[45] Date of Patent: Sep. 8, 1998

[54] THERMOSTAT BYPASS SYSTEM

[75] Inventor: George Robert Babinger, Vancouver, Canada

[73] Assignee: University of British Columbia, Vancouver, Canada

[21] Appl. No.: 851,319

[22] Filed: May 5, 1997

[51] Int. Cl.[6] .................................................. F01F 7/16
[52] U.S. Cl. .................... 236/34.5; 137/219; 236/DIG. 2
[58] Field of Search ...................... 236/34, 34.5, DIG. 2; 137/219

[56] References Cited

U.S. PATENT DOCUMENTS

| | | | |
|---|---|---|---|
| 4,431,133 | 2/1984 | Roberson, Sr. ........................ | 236/34.5 |
| 4,979,671 | 12/1990 | Bigcharles ............................. | 236/34.5 |
| 5,163,613 | 11/1992 | Ragan .................................... | 236/34.5 |
| 5,282,828 | 2/1994 | Ragan .................................... | 236/34.5 |
| 5,388,760 | 2/1995 | Ragan .................................... | 236/34.5 |
| 5,494,211 | 2/1996 | Ragan .................................... | 236/34.5 |

Primary Examiner—William E. Tapolcai
Attorney, Agent, or Firm—C. A. Rowley

[57] ABSTRACT

A thermostat bypass is formed using the periphery of a flange on the thermostat bearing against an annular inner surface of a housing to form a seal inhibiting fluid flow around the periphery of the thermostat. Movement of the thermostat by means of an axially sliding sleeve pushes the thermostat against a spring bias from the sealed position and permits flow of fluid through the housing and around the periphery of the thermostat into the sleeve to the outlet to thereby bypass the thermostat.

12 Claims, 3 Drawing Sheets

THERMOSTAT BYPASS SYSTEM

FIELD OF INVENTION

The present invention relates to an engine thermostat bypass system, more particularly, the present invention relates to a thermostat bypass system which in the open system permits flow from the periphery of the thermostat.

BACKGROUND OF THE INVENTION

Bypass valves that permit fluid to flow around or past the thermostat without passing through the valve of the thermostat are well known and many different and varied attempts have been made to design a thermostat bypass that may be used for example, with generic thermostat that may be easily switched from the operative position of the thermostat to the bypass position wherein a bypass passage is connected to permit flow around the thermostat.

U.S. Pat. No. 4,979,671 issued Dec. 25, 1990 to Bigcharles, discloses one such device. It used a ring with axial passages that are designed to be aligned with corresponding passages in a cooperating housing to permit flow around the thermostat where the ring is rotated to miss-align the passages and prevent flow. The device could be quite effective. However, rotary seals have to be provided to permit rotation of the ring to align or miss-align, i.e. operate the valve to prevent or permit flow. Such rotating seals are expensive and are likely to result in problems during the use of the system.

U.S. Pat. No. 5,163,613 issued Nov. 17, 1992 to Ragan and related U.S. Pat. Nos. 5,282,828, 5,388,760 and 5,494,211 all of which appear to have essentially the same disclosure described in a number of different embodiments of thermostat bypass systems in what appears to be the preferred system, the thermostat is mounted in a manner to form a pivoting valve, thus, is pivotal on an axis traversing the flow passage so that it may be pivoted to a bypass close position with the thermostat extending substantially perpendicular to the flow and a bypass open position wherein the thermostat is rendered totally inactive and effective in turn substantially perpendicular to the flow.

In another embodiment, the thermostat in axially movable in the periphery of the flange of the thermostat and functions to provide a seal in the bypass close position and is lifted from the seal or separated from the seal so that flow may pass around the outer periphery of the thermostat when the system is in the bypass mode.

In those embodiments using axial movement of the thermostat, the thermostat either relies on fluid flow to reseal the bypass valve when it is not positively displaced or the thermostat is fixed to a lever arm that firmly positions the thermostat in position when the bypass is closed. The lever mechanisms and overall structure of the system that incorporates axial movement as opposed to pivotal movement are relatively complicated and do not lend themselves to mounting to a hose structure, for example, by severing the hose and inserting a bypass.

BRIEF DESCRIPTION OF THE PRESENT INVENTION

It is an object of the present invention to provide simple and efficient thermostat bypass.

Broadly, the present invention relates to a thermostat bypass valve system comprising a housing defining a fluid flow passage between an inlet passage and an outlet passage, said fluid flow passage having a longitudinal axis and each of said inlet and outlet passages having longitudinal axes, means defining an annular seat in said fluid flow path in said housing, said annular seat extending circumferentially of said fluid flow passage, a thermostat mounted in said fluid flow passage for movement in said fluid flow passage between a bypass closed position wherein said seat mates with a mating portion of a circumferential flange of said thermostat to form a seal around the circumference of said thermostat and a bypass open position wherein said seat and mating portion are separated, biasing means for urging said thermostat into said bypass closed position and a sleeve mounted for axial movement relative to said fluid flow passage and positioned with one axial end adjacent to said thermostat, means for axially moving said sleeve in one direction to displace said thermostat toward said bypass open position when said sleeve is in an extended position and to permit said biasing means to force said thermostat into said bypass close position when said sleeve is fully retracted by movement in a direction opposite to said one direction.

Preferably, said longitudinal axis of said flow passage and of said inlet and outlet passages are substantially parallel.

Preferably, said axes are axially aligned.

Preferably, said fluid flow passage has at least one conical section reducing in diameter in the direction of movement of said thermostat from said bypass opened position to said bypass closed position whereby said thermostat tends to center itself in said tapered portion when moving toward said bypass closed position.

Preferably, means to move said sleeve includes a lever cam fixed to a shaft mounted in said housing to turn on its longitudinal axis substantially perpendicular to said longitudinal axis of said flow passage and a substantially L-shaped slot in said sleeve, said lever cam being shaped to be positioned within said slot and to be pivoted on said pivotal axis between a first position wherein said lever extends substantially parallel to said longitudinal axis of said flow passage and a second position wherein said lever extends substantially perpendicular to said flow passage, said slot having walls that cooperate with said lever to permit substantially only axial movement of said sleeve as said lever is pivoted.

Preferably, said sleeve is axially movable in said outlet passage.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
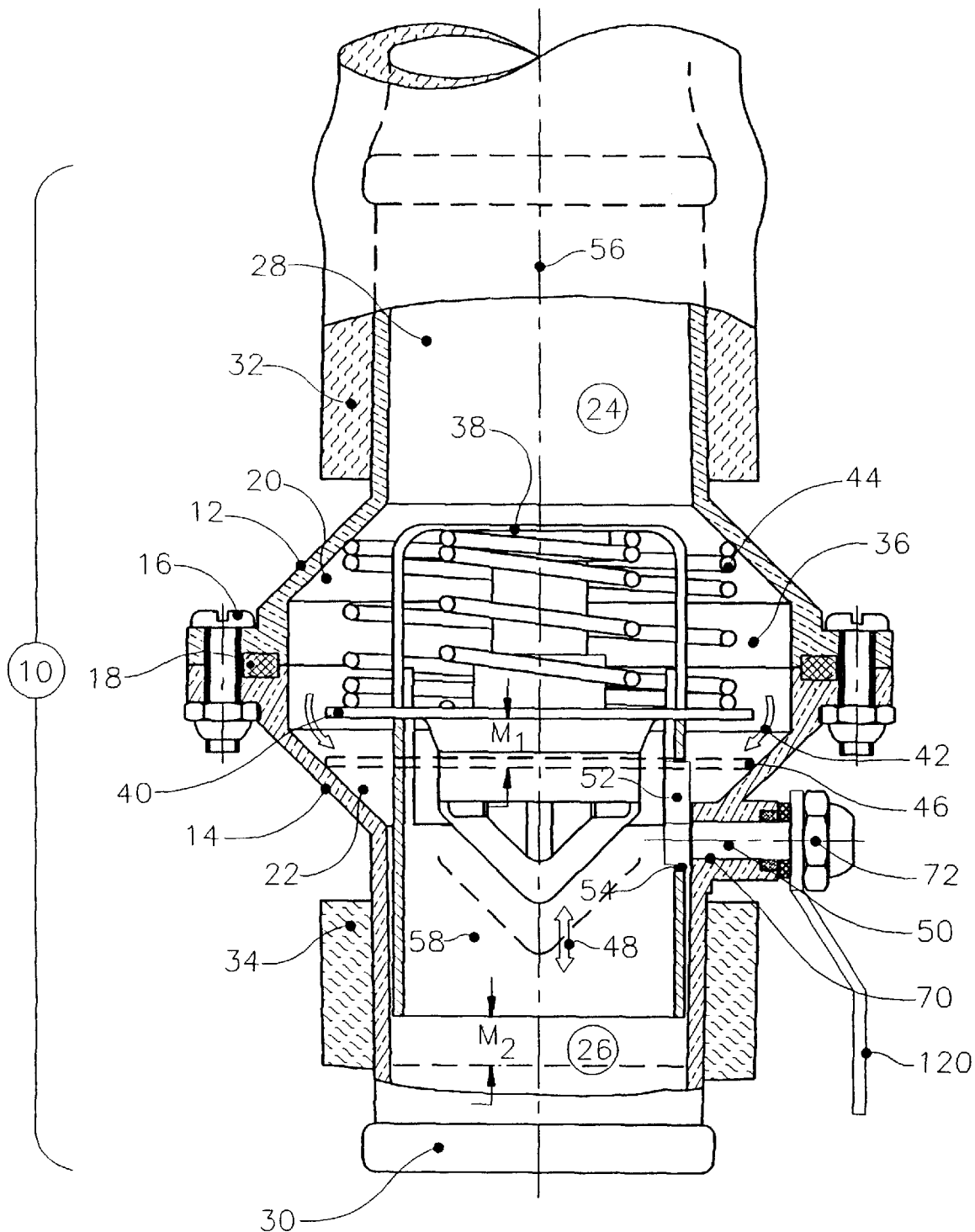
FIG. 1 is a cross-section through a thermostat bypass system constructed in accordance with the present invention.

As shown in FIG. 1, the bypass system 10 of the present invention is composed of a first housing section 12 and a second housing section 14 which are coupled together by suitable bolts or the like 16 which clamp the sections 12 and 14 together onto an O-ring seal 18 that seals the two housing sections 12 and 14 together. The housing sections are both conical and have their major diameters where the two housing 12 and 14 are clamped together The inner fluid passage 36 defined in the sections 12 and 14 is formed by the conical sections 20 and 22 which respectively taper from their major diameter ends to reduced diameter sections leading into inlet passage 24 and the outlet passage 26 respectively. The inlet and outlet passages 24 and 26 are cylindrical pipe sections with end flanges 28 and 30 and to which hoses as indicated at 32 and 34 are connected e.g. by suitable clamps. This construction permits the system 10 to be easily inserted into a radiator hose extending from the engine to the inlet to the radiator by simply severing that hose and coupling the end adjacent to the engine to the flange 28, i.e. hose 32 and the opposite end to the hose extending from the radiator, i.e. hose 34.

The conical sections 20 and 22 define a fluid flow passage 36 interconnecting the inlet passage 24 and the outlet passage 26. The tapered section 20 of the flow passage 36 expands the flow passage to provide a space sufficiently large enough to hold a conventional thermostat as indicated at 38 and the tapered section 22 converges to the outlet passage 26.

The thermostat 38 has a circumferential flange 40 which as will be described hereinbelow, cooperates with the inner surface of the conical section 22 to form a seal when the bypass passage is closed.

FIG. 1 shows the bypass passage open so that flow may pass as indicated by the arrows 41 around the flange 40 and into the outlet passage 26 through slots or passages 64 formed in the control or positioning sleeve 58 as will be described below.

A suitable spring 44 bears against the upstream side of the flange 40 and tends to force the thermostat 38 and flange 40 to the dot-dash position wherein the flange 40 bears against the inner conical surface 22 of the housing 14 to form a seal on the circumferential seat forming portion as indicated at 46 i.e. the inner surface of the tapered surface 22 forms a circumferential seat at 46 that cooperates with the flange 40 of the thermostat 38 to prevent flow around the periphery of the thermostat 38 when the bypass is in closed position.

To control the position of the thermostat 38 and thus the opening of the bypass around the periphery of the flange 40, the sleeve 58 as above described is mounted for movement axially within the outlet passage 26 as indicated by the arrow 48. This movement is controlled by rotation of the shaft 50 which in turn rotates the lever cam 52 that cooperates with a slot 54 (see FIG. 2) to move the sleeve 58 as will be described in more detail hereinbelow.

It will be apparent that the axis of the inlet passage 24, the fluid flow passage 36 and the outlet passage 26 are all substantially in alignment along the longitudinal axis 56 i.e. the conical sections 20 and 22 have the same conical axis and axial movement of the sleeve 58 in the passage 26 which results in axial movement of thermostat 38 in the passage 36 through engagement of the sleeve 58 with the thermostat 38 as will be described below.

Figure 3:
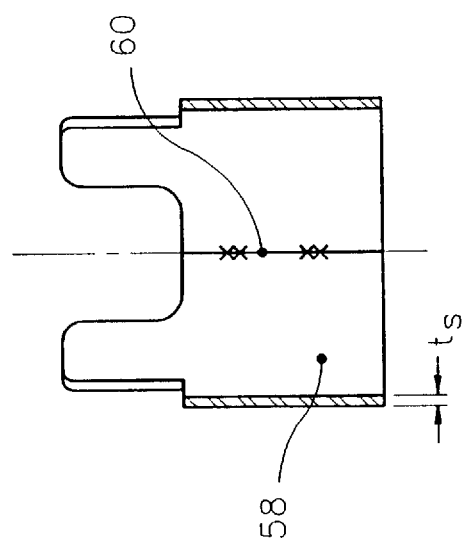
FIG. 3 is a section through the sleeve formed from the blank of FIG. 2 showing the weld-forming blank into a substantially cylindrical sleeve.
Figure 2:
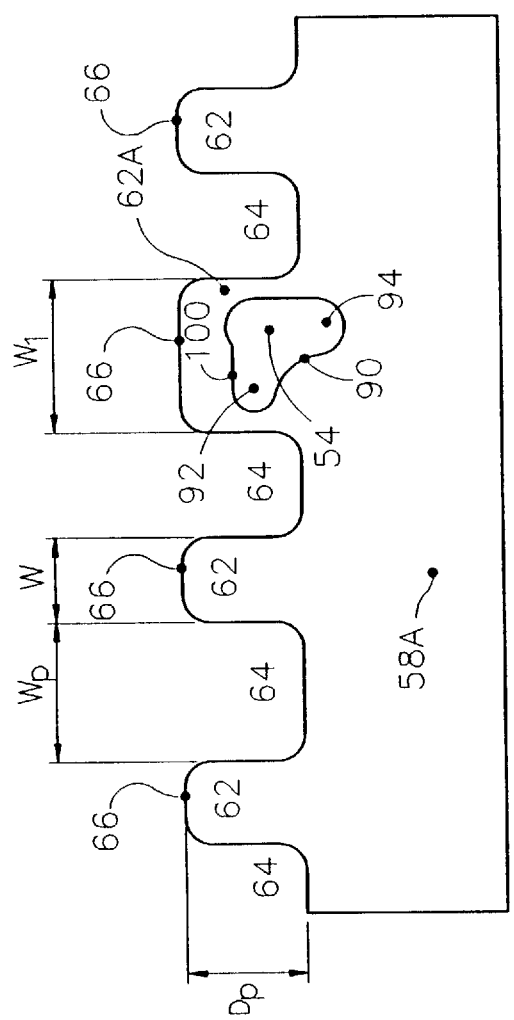
FIG. 2 is a planned view of a blank for forming a sleeve for moving the thermostat illustrating the shape and position of the caming slot.

Turning now to FIG. 2. Preferably, the sleeve 58 is formed from a length 58A of sheet metal or the like which is rolled into a cylindrical section and the adjacent ends secured together via welds or the like as schematically illustrated in FIG. 3 at 60 to form the cylindrical the sleeve 58.

Spaced axial projections 62 extending from the sleeve portion 58 define passages 64 therebetween and have free end edges 66 positioned within a plane substantially perpendicular to the cylindrical axis of the sleeve and which form bearing points to bear against the downstream side of the flange 40 of the thermostat 38. One of the projections 62 which is indicated at 62A is shown as being slightly wider than the other projections 62, i.e. the projections 62 have a width W whereas the projection 62A has a width $W_1$ which is substantially wider than the width W. The wider width of the projection 62A is to accommodate the cam slot 54 which cooperates with the cam lever 52 to cause axial movement of the sleeve 58 when the lever 52 is rotated as will be described hereinbelow.

The passages 64 have a width indicated at $W_p$ and a depth $D_p$ and their combined areas exposed to the flow when the sleeve 58 is in fully extended position i.e. the bypass fully open plus the area of the passage through the thermostat is at least as great as the cross-sectional area of the passages 24 or 26 (whichever is the smaller) so that when the bypass is open preferably the total area passage formed by the passages 64 is not applying a significant throttling action to the flow. Obviously the area of the passage around the periphery of the flange 40 (arrows 41) leading to the passages 64 must accommodate the full flow through the passages 64 when the thermostat 38 is in the bypass position.

In the arrangement illustrated, the passages 64 have a depth $D_p$ which corresponds essentially with the length projections 62 of the sleeve and the amount the ends 66 extend from the outlet passage 26 when the bypass is fully opened as illustrated in FIG. 1. This depth is not critical, however, it is preferred that the total area of the passages 64 when the bypass is in the full open position added to the area of the passage through the thermostat have a total area as above described at least equal to the cross-sectional area of the passages 24 and 26.

Figure 4:
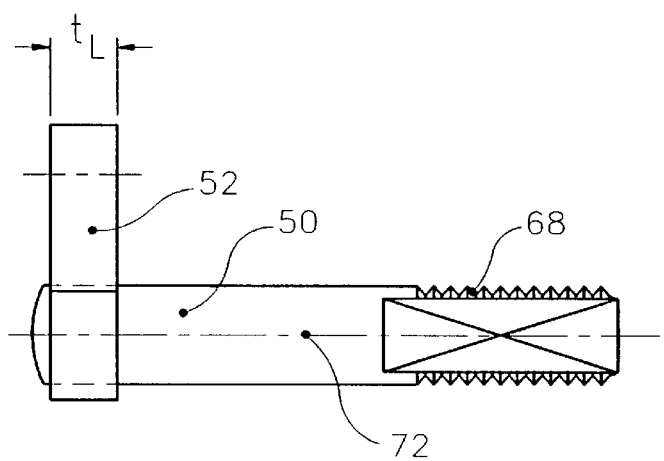
FIG. 4 is a side elevation of the shaft with the cam lever used to manipulate movement of the sleeve mounted thereon.

Turning now to FIG. 4, the cam for adjusting the position of the sleeve 58 is shown to include a shaft 50 that may be coupled to a suitable lever 120, which is bolted by the threads 68 to the shaft 50 so that movement of the lever 120 will rotate the shaft 50 to which cam lever 52 is fixed.

Turning back to FIG. 1, it will be noted that the shaft 50 extends through a suitable passage 70 in the housing 14. This passage 70 mounts the shaft 50 for rotation around an axis 72 that is substantially perpendicular to the longitudinal axis 56 of the passage 36.

The lever cam 52 has a width $t_L$ which is sufficient that at least a portion of the lever cam 52 preferably is wider than the thickness $t_S$ of the sleeve 58 so that the cam 52 projects right through the sleeve 58, i.e. right through the aperture forming the cam slot 54 in the sleeve 58.

The cam lever 52 is provided with caming surfaces 80 and 82 interconnected by a cam surface 84 extending around the free end of the cam lever 52. The base of the cam lever 52 is provided with a right cylindrical section 86 that is concentric with the axis of rotation 72 of the shaft 50.

The cam slot 54 is L shaped formed by a pair of mutually perpendicular arms 92 and 94 interconnect within the L shape by a caming surface 90.

Figure 7:
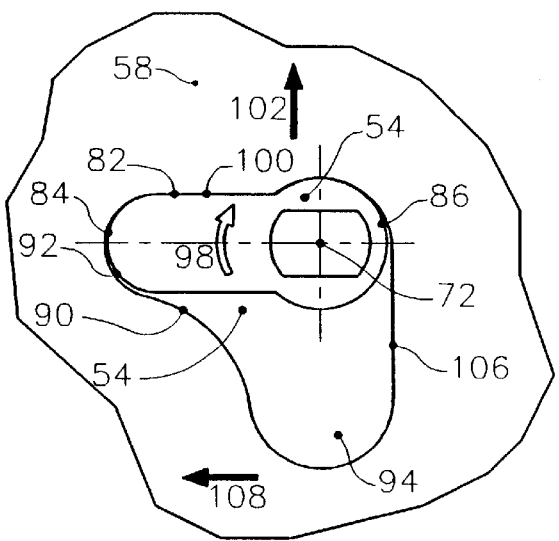
FIG. 7 is a view similar to FIG. 6 but with the sleeve in retracted position with the bypass valve closed.
Figure 6:
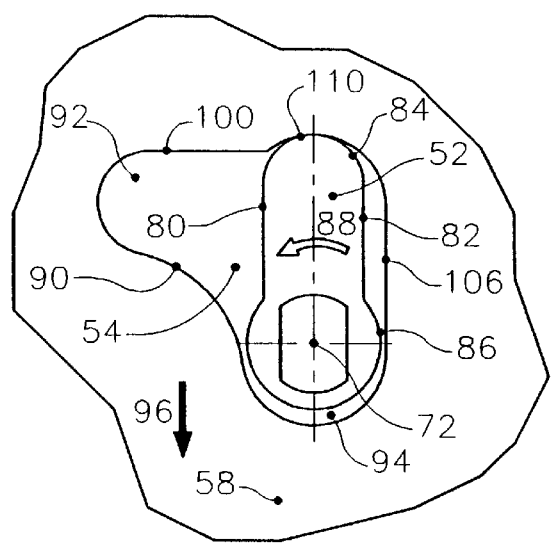
FIG. 6 is a schematic illustration of the cam lever and cam slot in the sleeve showing their relative positions with the sleeve in extended position opening the bypass valve.

The operation of the caming system is illustrated in FIGS. 6 and 7. In FIG. 6, the sleeve 58 is in extended position forcing the thermostat into the bypass open position that may be rotated by turning of the shaft 50 in the direction of the arrow 88 which forces the cam surface 80 against the mating cam surface 90 formed in the slot 54 in the area between the two arms 92 and 94. This contact of the surfaces 80 and 90 forces the sleeve 58 to move in the direction of the arrow 96 and move the sleeve 58 to retracted position closing the bypass. In the extended position (bypass open position) shown in FIG. 6 the lever cam 52 is accommodated in the arm 94 and when the cam 52 is pivoted to retract the sleeve 58 the lever cam 52 is accommodated in the arm section 92 as shown in FIG. 7.

When the cam lever 52 is moved in the direction indicated by the arrow 98, i.e. the shaft 50 is pivoted around the axis 72 in the opposite direction the cams 82 and 84 cooperate with the surface cam edge 100 formed by the outside edge of the arm 92 of the slot 54 to force the sleeve 58 in the direction of the arrow 102, i.e. toward the full open position of the bypass as shown in FIG. 6.

It is preferred that when the sleeve 58 is in the fully retracted position as illustrated in FIG. 7 and is shown in dot-dash line in FIG. 1, that the edges 66 at the end of the sleeve 58 be just clear of thermostat 38 so that the flange 40 is forced against the seal 46 by the full force of the spring 44, i.e. the distance $M_1$ is shorter than the distance $M_2$, $M_1$ being the distance the thermostat 38 moves between the open and close positions and $M_2$ being the distance between the sleeve 58 moves between the open and close positions (see FIG. 1) so that edges 66 of the sleeve are spaced from the thermostat when the bypass is closed.

The rounded section 86 at the free end of the cam lever 52 cooperates with the edge of cam surface 106 formed by the outside edge of the arm 94 to better ensure that the movement of the sleeve 58 remains substantially axial, i.e. in a straight line by preventing rotation of the sleeve in the direction of the arrow 108.

When the cam 52 is in its extreme positions, i.e. in the leg 94, the circular portion 86 cooperates with the end of the leg 94 and when the cam is in the position shown in FIG. 7, the circular portion 86 is received in the well 110 at the opposite end of the leg 94.

Figure 5:
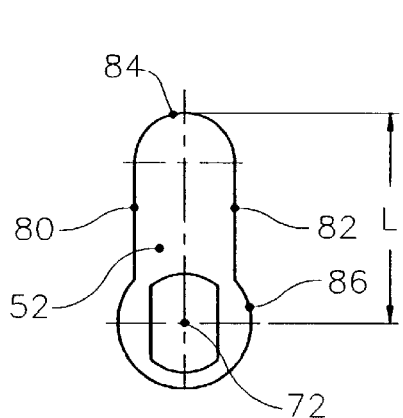
FIG. 5 is an end view showing the shape of the cam lever of FIG. 4.

The length of the cam as indicated by the dimension L in FIG. 5, i.e. the radius of the cam end 84 from the axis of rotation is preferably coordinated with the size of the slot 54, so that the cam end 84 stays in contact with the periphery of the slot 54 as the cam lever 52 is rotated.

Having described the invention, modifications will be evident to those skilled in the art without departing from the scope of the invention as defined in the appended claims.

I claim:

1. A thermostat bypass valve system comprising a housing defining a fluid flow passage between an inlet passage and an outlet passage, said fluid flow passage having a longitudinal axis and each of said inlet and outlet passages having longitudinal axes, means defining a fixed conical seat forming portion forming an annular seat in said fluid flow path in said housing, said conical seat forming portion having its conical axis concentric with said longitudinal axis at the location of said conical seat forming portion in said flow path, said annular seat extending circumferencially of said fluid flow passage, a thermostat having a circumferential flange with mating peripheral portion for cooperating with said annular seat, means mounting said thermostat in said fluid flow passage for movement in said fluid flow passage between a bypass closed position wherein said annular seat mates with said mating peripheral portion of said circumferential flange of said thermostat to form a seal around the circumference of said thermostat and a bypass open position wherein said annular seat and said mating peripheral portion are separated, biasing means for urging said thermostat into said bypass closed position and a sleeve mounted for axial movement relative to said fluid flow passage and positioned with one axial end adjacent to said thermostat, means for axially moving said sleeve in one direction to displace said thermostat toward said bypass open position when said sleeve is in an extended position and to permit said biasing means to force said thermostat into said bypass closed position when said sleeve is fully retracted by movement in a direction opposite to said one direction.

2. A thermostat bypass valve system as defined in claim 1 wherein said longitudinal axis of said flow passage and of said inlet and outlet passages are substantially parallel.

3. A thermostat bypass valve system as defined in claim 2 wherein said axes are axially aligned.

4. A thermostat bypass valve system as defined in claim 1 wherein said means to move said sleeve includes a lever cam fixed to a shaft mounted in said housing to turn on its longitudinal axis substantially perpendicular to said longitudinal axis of said flow passage and a substantially L-shaped slot in said sleeve, said lever cam being shaped to be positioned within said slot and to be pivoted on said pivotal axis between a first position wherein said lever extends substantially parallel to said longitudinal axis of said flow passage and a second position wherein said lever extends substantially perpendicular to said flow passage, said slot having walls that cooperate with said lever to permit substantially only axial movement of said sleeve as said lever is pivoted.

5. A thermostat bypass valve system as defined in claim 2 wherein said means to move said sleeve includes a lever cam fixed to a shaft mounted in said housing to turn on its longitudinal axis substantially perpendicular to said longitudinal axis of said flow passage and a substantially L-shaped slot in said sleeve, said lever cam being shaped to be positioned within said slot and to be pivoted on said pivotal axis between a first position wherein said lever extends substantially parallel to said longitudinal axis of said flow passage and a second position wherein said lever extends substantially perpendicular to said flow passage, said slot having walls that cooperate with said lever to permit substantially only axial movement of said sleeve as said lever is pivoted.

6. A thermostat bypass valve system as defined in claim 3 wherein said means to move said sleeve includes a lever cam fixed to a shaft mounted in said housing to turn on its longitudinal axis substantially perpendicular to said longitudinal axis of said flow passage and a substantially L-shaped slot in said sleeve, said lever cam being shaped to be positioned within said slot and to be pivoted on said pivotal axis between a first position wherein said lever extends substantially parallel to said longitudinal axis of said flow passage and a second position wherein said lever extends substantially perpendicular to said flow passage, said slot having walls that cooperate with said lever to permit substantially only axial movement of said sleeve as said lever is pivoted.

7. A thermostat bypass valve system as defined in claim 1 wherein said sleeve is axial movable in said outlet passage.

8. A thermostat bypass valve system as defined in claim 2 wherein said sleeve is axially movable in said outlet passage.

9. A thermostat bypass valve system as defined in claim 3 wherein said sleeve is axially movable in said outlet passage.

10. A thermostat bypass valve system as defined in claim 4 wherein said sleeve is axially movable in said outlet passage.

11. A thermostat bypass valve system as defined in claim 5 wherein said sleeve is axially movable in said outlet passage.

12. A thermostat bypass valve system as defined in claim 6 wherein said sleeve is axially movable in said outlet passage.

* * * * *